(12) United States Patent
Hamada (10) Patent No.: US 10,415,620 B2
(45) Date of Patent: Sep. 17, 2019

(54) EXPANSION ANCHOR

(71) Applicant: Yuji Dohi, Hong Kong (HK)

(72) Inventor: Toshiji Hamada, Omihachiman (JP)

(73) Assignee: Yuji Dohi, Hong Kong (HK)

( * ) Notice: Subject to any disclaimer, the term of this patent is extended or adjusted under 35 U.S.C. 154(b) by 132 days.

(21) Appl. No.: 15/547,349

(22) PCT Filed: Jan. 29, 2016

(86) PCT No.: PCT/JP2016/052833
§ 371 (c)(1),
(2) Date: Jul. 28, 2017

(87) PCT Pub. No.: WO2016/121993
PCT Pub. Date: Aug. 4, 2016

(65) Prior Publication Data
US 2018/0023606 A1 Jan. 25, 2018

(30) Foreign Application Priority Data

Jan. 30, 2015 (JP) ................................. 2015-017018

(51) Int. Cl.
*F16B 13/12* (2006.01)
*F16B 13/08* (2006.01)
(Continued)

(52) U.S. Cl.
CPC ...... *F16B 13/0891* (2013.01); *F16B 13/0833* (2013.01); *F16B 13/124* (2013.01); *F16B 35/005* (2013.01); *F16B 37/122* (2013.01)

(58) Field of Classification Search
CPC .... F16B 19/02; F16B 13/146; F16B 13/0891; F16B 13/124
(Continued)

(56) References Cited

U.S. PATENT DOCUMENTS

| 734,326 A | * | 7/1903 | Hicks | ................... F16B 13/124 411/59 |
| 754,764 A | * | 3/1904 | Gottshalk | ............. F16B 13/124 411/63 |

(Continued)

FOREIGN PATENT DOCUMENTS

| DE | 20 2013 010 334 U1 | 3/2014 |
| IN | 714/KOLN/2013 | 7/2013 |

(Continued)

OTHER PUBLICATIONS

Office Action Received in the corresponding Singapore Patent application, Sep. 3, 2018 (13 pages).

(Continued)

*Primary Examiner* — Flemming Saether
(74) *Attorney, Agent, or Firm* — Hamre, Schumann, Mueller & Larson, P.C.

(57) ABSTRACT

An expansion anchor includes a hollow shaft 3 and a bolt 9 to be screwed thereinto from a base end side of the hollow shaft. The hollow shaft 3 is formed, at a portion thereof short of a tip end 3a, with a radially expansive portion 7 which includes slits 6, and a multiplicity of balls 10 are inserted into the radially expansive portion 7. When the bolt 9 is screwed, the balls 10 push against each other and move radially. As a result, the radially expansive portion 7 deforms expansively for securely engaging with a pre-formed hole 2. Even when the radially expansive portion 7 expands, stress does not concentrate at a specific portion of an installation region 1, so that it is possible to provide a high withdrawal resistance while preventing cone-type failure. The management of the withdrawal resistance can be easily performed by screwing the bolt 9) using a wrench with a torque limiter or by screwing the bolt 9 using a torque wrench.

6 Claims, 8 Drawing Sheets

(51) Int. Cl.
*F16B 35/00* (2006.01)
*F16B 37/12* (2006.01)

(58) Field of Classification Search
USPC .............................................. 411/19, 59, 45
See application file for complete search history.

(56) References Cited

U.S. PATENT DOCUMENTS

| | | | | |
|---|---|---|---|---|
| 1,487,290 | A * | 3/1924 | Tomkinson | F16B 13/12 411/23 |
| 1,630,499 | A * | 5/1927 | Ross | F16B 39/36 16/274 |
| 2,535,079 | A * | 12/1950 | Lebert | F16B 19/12 29/421.1 |
| 2,872,838 | A * | 2/1959 | Vogel | F16B 19/00 192/38 |
| 2,950,602 | A * | 8/1960 | Lang | E21D 21/008 405/259.3 |
| 3,942,407 | A * | 3/1976 | Mortensen | F16B 13/061 411/36 |
| 3,945,294 | A | 3/1976 | Jarman | |
| 4,026,184 | A | 5/1977 | Sozzi | |
| 4,954,017 | A * | 9/1990 | Davis | E21D 21/004 405/259.3 |
| 5,271,700 | A * | 12/1993 | Le Goff | F16B 13/06 403/277 |
| 5,975,788 | A * | 11/1999 | Cousins | B23Q 3/18 403/289 |
| 2004/0136802 | A1 | 7/2004 | Lin et al. | |
| 2010/0096792 | A1 | 4/2010 | Demmeler | |

FOREIGN PATENT DOCUMENTS

| | | |
|---|---|---|
| JP | 51-24450 A | 2/1976 |
| JP | 52-6970 | 1/1977 |
| JP | 4-27209 U | 3/1992 |
| JP | 3007126 U | 11/1994 |
| JP | 2004-218421 A | 8/2004 |
| JP | 2013-108544 A | 6/2013 |

OTHER PUBLICATIONS

Search Report received in the corresponding European Patent application, Oct. 5, 2018 (7 pages).
International Search Report issued in PCT/JP2016/052833, dated Apr. 26, 2016 (2 pages).

\* cited by examiner

EXPANSION ANCHOR

TECHNICAL FIELD

The present invention relates to an expansion anchor of the type in which a portion of a hollow shaft is bulged by screwing of a bolt.

BACKGROUND ART

Expansion anchors are used to attach various members such as fittings to stony structures made of concrete or the like, as in the case where various members are suspended from the inner surface of a tunnel, for example. There are various types of expansion anchors. In general, the tip end of a hollow shaft (anchor body) is divided by a plurality of circumferentially separated longitudinal slits to provide an radially expansive portion (expansion portion), and the radially expansive portion is bulged utilizing a wedging action caused by screwing of a bolt.

There is also an expansion anchor of the type that utilizes, instead of a bolt, a pin with a tapering tip portion having a progressively decreasing diameter toward the tip end. In this case, the pin is impacted with a hammer for insertion into the hollow shaft.

There is also a proposal in which an anchor body is expanded indirectly instead of being directly expanded with a bolt. In one example shown in Patent Document 1, a ball made of metal is inserted into a radially expansive portion for bulging the radially expansive portion due to an expanding action caused by the ball. Patent Document 2 also discloses a similar configuration. Patent Documents 3 and 4 disclose use of a fusiform member as a radially expanding member instead of the ball.

PRIOR ART DOCUMENTS

Patent Documents

Patent Document 1: JP 2004-218421A
Patent Document 2: Microfilm of JP H4-272019U
Patent Document 3: Japanese Registered Utility Model No. 3007126
Patent Document 4: Microfilm of JP S52-6970U

SUMMARY OF THE INVENTION

Problem to be Solved by the Invention

As described above, the expansion anchors disclosed in the patent documents and the hit-type expansion anchors provide a withdrawal resistance by expanding the radially expansive portion located at the tip end of the hollow shaft into a flaring shape and pressing the radially expansive portion against a pre-formed hole. However, in reality, there is a limit on how much the withdrawal resistance of the conventional expansion anchors can be increased (in the case of the hit-type expansion anchors, the withdrawal resistance is fixed theoretically).

A troublesome problem regarding an expansion anchor is a phenomenon called cone-type failure wherein a portion of concrete centered around the expansion anchor at the installation region comes off in the form of a cone. Such a cone-type failure occurs due to the expansion of the radially expansive portion of the anchor. Therefore, in order to prevent the cone-type failure, an expansion anchor is designed in a manner such that the radially expansive portion thereof do not expand excessively, which is one of the detrimental factors in enhancing the withdrawal resistance.

A more troublesome problem is that, when an anchor is engaged into the ceiling of a concrete tunnel for example, the weight of a workpiece acts as a downward load on the expansion anchor, and this downward load may cause cone-type failure. In other words, even if there appears no problem at the time of installation, a cone-type failure occurs as a delayed failure upon lapse of time.

The present invention, which has been conceived in light of the aforementioned circumstances, provides an expansion anchor that keeps a high withdrawal resistance while also providing a high functionality for preventing a cone-type failure.

Means for Solving the Problem

The present invention includes various structural features. Typical aspects thereof are identified as first to fifth inventions.

The first invention is a generic invention which provides an expansion anchor includes a hollow shaft to be inserted, from a tip end thereof, into a pre-formed hole formed in an installation region, and a bolt to be screwed into the hollow shaft from outside the installation region, wherein the hollow shaft is formed with a radially expansive portion, that is weakened to be bulgeable, at a portion of the hollow shaft within the pre-formed hole and short of the tip end of the hollow shaft, and the hollow shaft is internally provided with a radially expanding action member that pushes the radially expansive portion radially outward in response to pushing action caused by screwing of the bolt into the hollow shaft.

According to the present invention, the hollow shaft does not need to be open at both ends if at least its base end (to be located outside of the installation region) is open. Therefore, the tip end to be inserted into the pre-formed hole may have a solid structure. Further, according to the present invention, a plurality of radially expansive portions can be provided. These are the major features of the present invention.

In general, the expansion anchor may usually have a perfect circular shape, but its shape is not necessarily limited to a perfect circle in the present invention. For example, the present invention may comprise a structure in which the entire hollow shaft or only the radially expansive portion is formed in a non-perfect circle such as an ellipse or a polygon. Examples of a non-perfect circular shape also include a shape that basically follows a perfect circle but has two flat faces which are parallel to each other. The pre-formed hole is generally formed in a perfect circular shape at the installation region using a rotating drill. However, when the hollow shaft has a non-perfect circular shape, the pre-formed hole may be processed into a non-perfect circle corresponding to the shape of the hollow shaft.

The second invention is a development of the first invention in which the radially expansive portion of the hollow shaft is formed with a plurality of axially elongated slits that are circumferentially spaced from each other. In other words, according to the second invention, a portion of the hollow shaft in which the slits are formed serves as a radially expansive portion. The number of the slits may be selected depending on the outer diameter or thickness of the hollow shaft. In general, three to six slits may be usually formed. The slits in a group may be arranged at circumferentially regular or irregular intervals.

The third invention is a development of the first invention or second invention in which the radially expanding action member includes a multiplicity of metal balls, and the radially expansive portion is allowed to bulgingly deform due to the balls moving radially outward in group in response to a push from the bolt. Regarding the balls in the group may be entirely equal in diameter, or they may include a plurality of diametrically different balls.

The fourth invention is a development of the third invention. According to the third invention, the radially expansive portion has an axial length that is at least twice an outer diameter of the hollow shaft. The fourth invention may also be regarded as a development of the first invention or second invention. One major feature of the present invention is that the length of the radially expansive portion can be set to be extended.

A member such as a fitting may be attached to the expansion anchor. The fifth invention is an implementation in this regard. More specifically, the fifth invention is based on the third invention, wherein the hollow shaft is configured such that the other end is exposed outside the installation region, at least a portion of the hollow shaft that is exposed outside of the installation region is formed with fixing threads, and the fixing male screw is engageable with a nut for mounting another member. The fifth invention may also be regarded as a development of the first, second invention, or fourth invention.

Advantageous Effects of the Invention

According to the present invention, the radially expansive portion is located at a position short of the tip end of the hollow shaft. Therefore, the radially expansive portion does not expand into a flaring form but bulges expansively in a direction orthogonal to the axis. This bulging portion comes into biting engagement with the pre-formed hole at the installation region (made of concrete), consequently providing a resistance against withdrawal.

According to the present invention, even if the radially expansive portion comes into deep biting engagement with the installation region, such an engagement does not lead to much increase of the compressive force with which the radially expansive portion presses against the installation region in a direction orthogonal to the axis. The reason for this seems to be that the bulging portion engages with the installation region in a biting manner. Accordingly, it is possible to provide a high withdrawal resistance while preventing a cone-type failure.

One feature of the present invention resides in that the length of the radially expansive portion can be increased. Thus, the radially expansive portion having an increased length can come into deep biting engagement with the installation region, thereby contributing greatly to an increase in withdrawal resistance (namely, fastening strength).

Due to the above-noted features of according to the present invention, the expansion anchor is particularly useful as a fastening tool to suspend a member from a concrete ceiling of a tunnel or building. Furthermore, according to the present invention, when the hooking force of the radially expansive portion reduces due to a timewise damage of the installation region for example, the withdrawal resistance may be restored by screwing the bolt to expand the radially expansive portion. Therefore, it is easy to adjust the torque to keep the withdrawal resistance at an appropriate value. In the case where the bolt has slided down, it is preferable to expand the radially expansive portion again after pushing the bolt back to the original depth.

In the expansion anchor according to the present invention, since the radially expanding action member can be easily retreated by screwing back the bolt, it is easy to pull out the expansion anchor, which has been once attached, against the elastic force of the radially expansive portion. Accordingly, it is also easy to remove an unnecessary anchor and replace it with a new one.

The slits formed according to the second invention as a means for forming the radially expansive portion is preferable because this enables the radially expansive portion to bulge in a reliable manner. Moreover, when the radially expansive portion is divided by the slits into a plurality of circumferentially separated sections, a specific one or ones of the sections are more likely to bulge for more readily coming into biting engagement with the installation region to provide better hooking to the installation region. Accordingly, it is possible to provide a high fastening strength can be reliably obtained while preventing cone-type failure.

Metal balls (particularly steel balls) are widely used in various fields such as bearings, and various types of metal balls are commercially available. Therefore, when the metal balls are used as the radially expanding action member as set forth in claim 3, it is possible to suppress the manufacturing cost due to ready availability of metal balls requiring no dedicated manufacturing apparatus.

Furthermore, when the metal balls are used as the radially expanding action member, the metal balls come into point contact with the radially expansive portion from the inside, so that the entire circumference of the radially expansive portion is not pressed uniformly. Instead, only specific circumferential positions of the radially expansive portion are pressed outward by the metal balls. As a result, the area of engagement of the radially expansive portion with the installation region is reduced, so that the radially expansive portion can easily come into biting engage with the installation region. In other words, the radially expansive portion can easily come into deep engagement with the installation region in the manner of biting into the installation region. In this way, it possible to provide a high hooking force while suppressing the compressive force against the installation region.

Therefore, the metal balls as the radially expanding action member is advantageous in providing a high fastening strength without causing cone-type failure.

The length (axial length) of the radially expansive portion may be selected depending on the required withdrawal resistance. When the radially expansive portion has an axial length that is at least twice an outer diameter of the hollow shaft as in the fourth invention, the radially expansive portion can be bulged reliably, so that a high withdrawal resistance (fastening strength) can be secured more reliably.

In the case of a suspending expansion anchor for use on the ceiling of a tunnel for example, the maintenance of a predetermined withdrawal resistance is a very important factor. Therefore, the magnitude of the withdrawal resistance is checked regularly or as needed, and the withdrawal resistance, having dropped, should be restored to a preset value. A checking operation may be performed by rotating the bolt using a torque wrench. However, if a suspended member has to be removed every time the bolt is rotated using a torque wrench, the checking operation becomes troublesome.

By contrast, if the fifth invention is employed, the head of the bolt pressing the radially expanding action member can be kept exposed outside of the installation region, so that the bolt can be rotated using a torque wrench while a member such as a ceiling panel or a ceiling frame is kept suspended by the expansion anchor. Accordingly, a maintenance operation can be performed very easily for checking whether or not the withdrawal resistance of the expansion anchor is kept at a predetermined value and restoring the withdrawal resistance which has dropped.

In the maintenance operation, it is possible to try to rotate the bolt using a power-assisted wrench with a torque limiter (or a clutch) instead of rotating the bolt using a torque wrench. In this case, when the withdrawal resistance has decreased, the bolt rotates, and when a predetermined withdrawal resistance is kept, the bolt does not rotate. Therefore, the operating efficiency is very high.

BRIEF DESCRIPTION OF DRAWINGS

FIG. 1(A) is a sectional side view of a first embodiment, FIG. 1(B) is a sectional view taken along line B-B in FIG. 1(A), FIG. 1(C) is a sectional view taken along line C-C in FIG. 1(A), FIG. 1(C') is a sectional view of another example, FIG. 1(D) is a sectional view taken along line D-D in FIG. 1(A), FIG. 1(E) is a view showing a radially expanded state, and FIG. 1(B) is a view showing a state in which a member has been attached.

Figure 1:
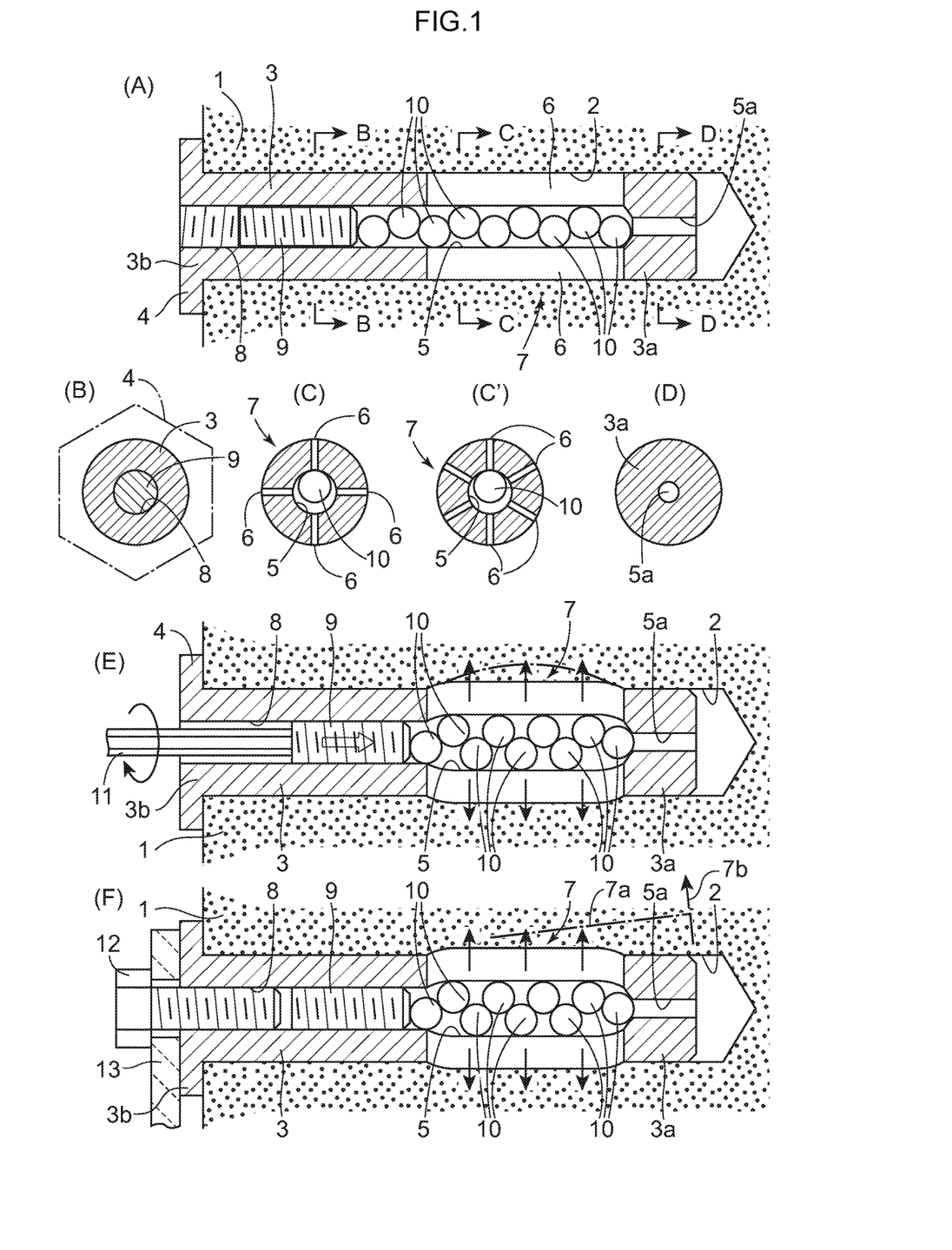

MODE FOR CARRYING OUT THE INVENTION (1) First Embodiment (FIG. 1)

Next, embodiments of the present invention will be described based on the drawings. First, description is made as to a first embodiment shown in FIG. 1. An expansion anchor includes a hollow shaft 3 to be inserted into a pre-formed hole 2 in an installation region 1 made of concrete. In the hollow shaft 3, an end that will enter the pre-formed hole 2 is defined as a tip end 3a, and an opposite end is defined as a base end 3b. The base end 3b of the hollow shaft 3 is provided with a flange (or head) 4 having a hexagonal shape or a circular shape.

The hollow shaft 3 is formed with a hole 5 over the entire length thereof, and the hole 5 has a small-diameter portion 5a within a certain range from the tip end 3a. The tip end 3a may have a solid structure in which the small-diameter portion 5a of the hole 5 is eliminated. The hole 5 may have a constant diameter over the entire length thereof, and the tip end 3a is closed with a plug. The hollow shaft 3 may also be formed by stretching a hollow coil pipe with a small-diameter hole. In this case, the inner diameter of the material coil pipe remains as the diameter of the small-diameter portion 5a, whereas the other portion of the hollow shaft is diametrically enlarged by drilling or the like. The material of the hollow shaft 3 may be selected as needed. When high durability and rust-resistance are required as in the case of anchors for tunnels, it is preferable to use a hollow shaft made of stainless steel. Steel that has undergone surface treatment such as plating is also preferable.

Within a certain range of the hollow shaft 3 short of the tip end 3a, there are formed four axially elongated slits 6 at regular circumferential intervals. The portion of the hollow shaft in which the slits 6 are formed serves as an radially expansive portion 7 that is bulgeable in a direction orthogonal to the axis. Therefore, the slits 6 do not extend into the tip end 3a of the hollow shaft 3. Further, the slits 6 communicate with the inside and outside of the hollow shaft 3. The slits 6 may be machined using a milling cutter, for example.

The number of the slits 6 can be selected as desired. In the example shown in FIG. 1(C'), six slits 6 are formed. The axial length of the radially expansive portion 7 is set to be about twice the outer diameter of the hollow shaft 3. When the radially expansive portion 7 has a small thickness, the radially expansive portion 7 can be easily deformed even if its length is shorter than twice the outer diameter of the hollow shaft 3.

The hole 5 of the hollow shaft 3 is formed with a female screw 8 in a portion (toward the base end 3b) short of the radially expansive portion 7, and a hexagonal-socket bolt 9 is screwed into the female screw 8 from the outside (the female screw 8 may extend into the radially expansive portion 7). A multiplicity of metal balls (steel balls) 10, as an example of radially expanding action member, are accommodated between the bolt 9 and the tip end 3a. The outer diameters of the balls 10 are set to be slightly smaller than the inner diameter of the hole 5, and in the illustrated example, the balls 10 have an equal outer diameter. It will be appreciated that the outer diameter of the balls 10 may be set to be substantially equal to the inner diameter of the hole 5.

When the bolt 9 does not press the balls 10, part of the balls 10 is located on the base end side with respect to the radially expansive portion 7. The outer diameter of the hollow shaft 3 and the inner diameter of the hole 5 may be set as desired. In other words, the thickness of the hollow shaft 3 may be set as desired.

A method of using the expansion anchor is similar to a conventional method. As shown in FIG. 1(E), the hollow shaft 3 is fitted into the pre-formed hole 2 in the installation region 1, and then the bolt 9 is screwed thereinto using a hexagonal bit 11. This causes the group of balls 9 to be moved in a chain reaction manner. The adjacent balls 10 are in contact with each other, and therefore, the balls 10 also tend to move radially of the hollow shaft 3. As a result, the radially expansive portion 7 deforms expansively over a long range and engages with the pre-formed hole 2 in the installation region 1.

The radially expansive portion 7 is shown to expand into a plateau shape by solid lines in FIGS. 1(E) and 1(F). In reality, however, the radially expansive portion 7 is more likely to bulge in a mountain-like shape (or a bow shape) as indicated by a chain line in FIG. 1(E) because the balls 10 pressing against one another act such that the balls 10 located at weaker portions are pressed more strongly. More specifically, although the balls 10 come into point contact with the radially expansive portion 7, the ball 10 that comes into contact with the weakest portion of the radially expansive portion 7 is most strongly pressed by the other balls 10, so that the radially expansive portion 7 is deformed in a mountain-like shape. When the length of the radially expansive portion 7 is reduced, the radially expansive portion 7 inevitably bulges in a mountain-like shape or a bow shape.

The radially expansive portion 7 is divided into a plurality of sections by the slits 6. It is more likely that the weakest one of these sections is concentratively bulged rather than all sections bulging uniformly. Therefore, in general, bulging may occur only at one circumferential position of the radially expansive portion 7.

Incidentally, the tip end of a conventional expansion anchor expands in a flaring manner. Such an expansion state is schematically shown by a chain line in FIG. 1(F), and a radially expansive portion is denoted by a reference numeral 7a. In this case, the leading end of the radially expansive portion 7' moves as indicated by an arrow 7b, and a pressing force (compressive load) acts on the installation region 1 made of concrete as indicated by the arrow 7b. In this state, a boundary may be generated in the installation region 1 made of concrete between a portion pressed strongly by the radially expansive portion 7a and a portion not so pressed. Thus, it is speculated that a sliding phenomenon occurs along the boundary, resulting in cone-type failure. Furthermore, the radially expansive portion 7a applies a pressing force in the direction 7b which is inclined relative to the anchor axis, and it is also speculated that the boundary is likely to form a conical surface, which may promote cone-type failure.

According to the illustrated embodiment of the present invention, on the other hand, the radially expansive portion 7 is deformed into a mountain-like shape or the like. It is thus speculated that the radially expansive portion 7 engages with the installation region 1 while biting into the structural material instead of strongly pressing against the installation region 1. In other words, it is considered that the expansion anchor according to the embodiment of the present invention is hooked to the pre-formed hole due to biting rather than staying in the pre-formed hole due to friction. This makes it possible to achieve a high withdrawal resistance while preventing cone-type failure.

Moreover, according to the embodiment of the present invention, the radially expansive portion 7 bulges in a direction orthogonal to the axis of the hollow shaft 3, so that a boundary may not be formed in the installation region 1 between a portion subjected to a strong pressing force and a portion not subjected to a strong pressing force. Instead, the pressing force (compressive stress) acting on the installation region 1 changes gradually in the axial direction, thereby contributing greatly to the prevention of cone-type failure.

The hexagonal bit 11 is attached to a torque wrench. The pushing force of the radially expansive portion 7 against the pre-formed hole 2 is proportional to the screwing torque of the bolt 9. Therefore, when a predetermined screwing torque is reached by screwing the bolt 9 with a torque wrench, rotation of the bolt is stopped. The bolt 9 has deeply entered into the female screw hole 8 when the radially expansive portion 7 is bulged. Therefore, a member 13 can be fixed to the base end surface of the hollow shaft 3 by screwing a fastening bolt 12 into the female screw hole 8. Accordingly, a state has to be achieved in which the bolt 9 enters entirely into the female screw hole 8 to allow another bolt to be further screwed into the female screw hole 8 from the outside.

The use mode of the expansion anchor may be set as desired depending on the conditions of the installation region. When the pre-formed hole 2 is formed in the ceiling surface of a structure, it is sufficient that a suspension bolt is screwed into the hollow shaft 3 from below, and various members such as a ceiling panel is suspended by the suspension bolt (this example will be described later). It is sufficient that the length of the radially expansive portion 7 is set as desired depending on the length of the hollow shaft 3, required withdrawal resistance, or the like.

Figure 2:
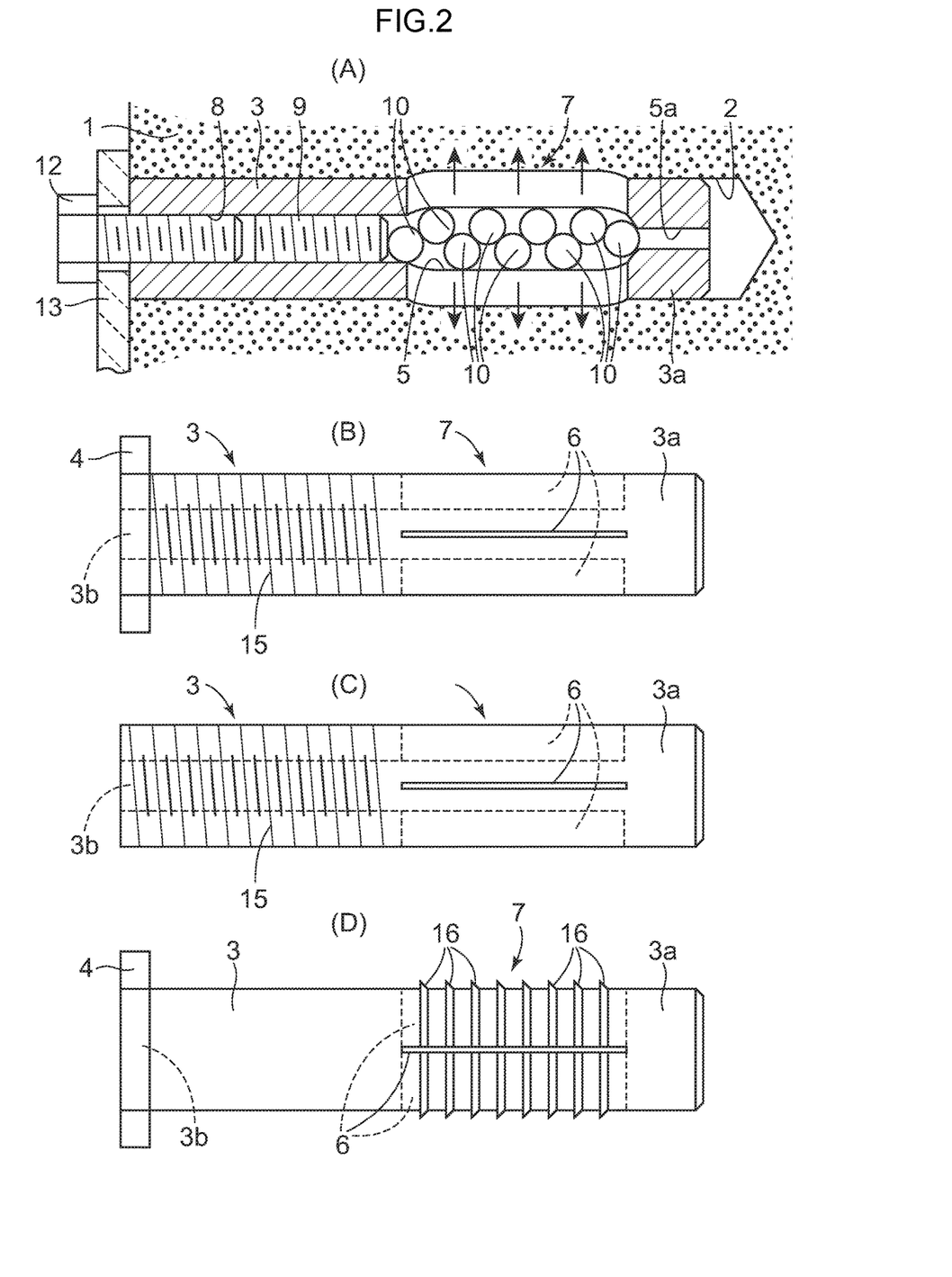
FIG. 2(A) is a sectional side view of a second embodiment.
FIG. 2(B) is a side view of a third embodiment.
FIG. 2(C) is a side view of a fourth embodiment.
FIG. 2(D) is a side view of a fifth embodiment.

(2) Second to Fifth Embodiments (FIG. 2)

Next, second to fifth embodiments shown in FIG. 2 will be described. According to the second embodiment shown in FIG. 2(A), the base end 3a of the hollow shaft 3 is provided with no flange, but the second embodiment has otherwise the same structure as the first embodiment. The radially expansive portion 7 is shown to bulge in a trapezoidal shape. In reality, however, the radially expansive portion 7 is more likely to bulge in a mountain-like shape as indicated by the chain line in FIG. 1(E).

The third embodiment shown in FIG. 2(B) and the fourth embodiment shown in FIG. 2(C) share a common structure in which the outer circumference of the hollow shaft 3 is formed with an engaging male screw 15 for engagement with the pre-formed hole. In the example shown in FIG. 2(B), a flange 4 is formed at the base end 3b of the hollow shaft 3, whereas a straight structure of the hollow shaft without a flange 4 is obtained in the example shown in FIG. 2(C). The engaging male screw 15 may have a pitch that is plural times larger than the thread width for facilitating the inserting engagement into the pre-formed hole 2 in the installation region 1. A plurality of threads having different heights may also be formed.

In the case where the engaging male screw 15 is formed, when the flange 4 as shown in FIG. 2(B) is formed in a polygonal shape such as a hexagonal shape that can be rotated using a spanner (wrench), the hollow shaft 3 can be easily screwed into the pre-formed hole 2.

In the illustrated embodiment, the engaging male screw 15 is formed only up to a position short of the radially expansive portion 7. However, the engaging male screw 15 may be formed to extend also over the entirety of the radially expansive portion 7. The engaging male screw 15 formed to extend over the radially expansive portion 7 is expected to remarkably improve the withdrawal resistance because the engaging male screw 15 comes into strong biting engagement with the pre-formed hole 2 due to bulging of the radially expansive portion 7.

In the fifth embodiment shown in FIG. 2(D), a multiplicity of annular projections 16 are formed on the radially expansive portion 7. Each annular projection 16 has a cross-sectional shape of a right-angled triangle with its inclined surface oriented toward the tip end 3a, consequently providing a high withdrawal resistance. The annular projections 16A may be replaced with a spiral projection.

Alternatively, the outer circumference of the radially expansive portion 7 may be knurled.

(3) Sixth to Ninth Embodiments

Figure 3:
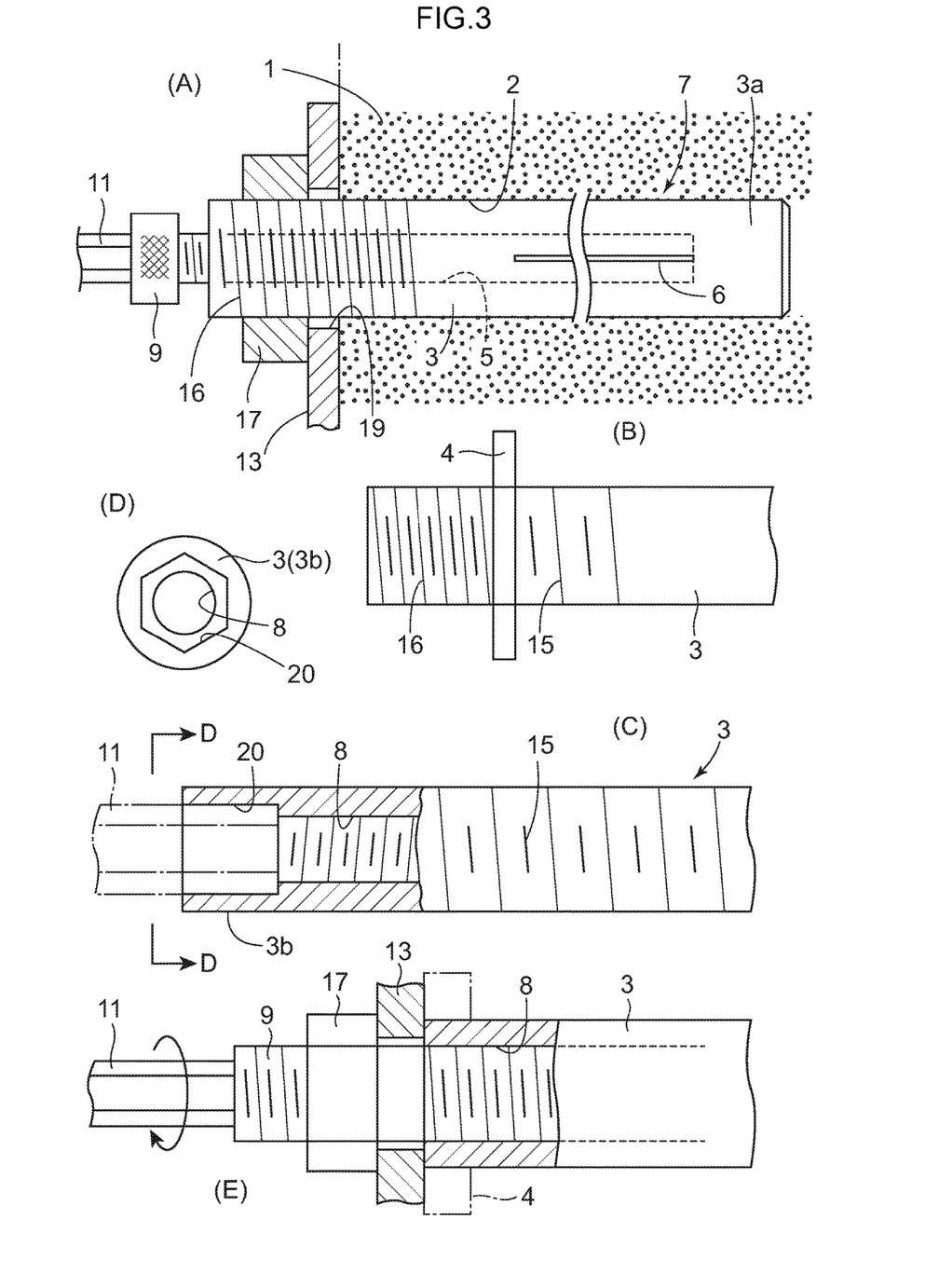
FIG. 3(A) is a partially cutaway side view of a sixth embodiment.
FIG. 3(B) is a partial side view of a seventh embodiment.
FIG. 3(C) is a partially cutaway side view of a eighth embodiment.
FIG. 3(D) is a sectional view taken along line D-D in FIG. 3(C)
FIG. 3(E) is a partially cutaway side view of a ninth embodiment.

Next, sixth to ninth embodiments shown in FIG. 3 will be described. In the sixth embodiment shown in FIG. 3(A), a fixing male screw 16 for screwing engagement with a nut 17 is formed within a certain range on the base end side of the hollow shaft 3. Therefore, the fixing male screw 18 serves as a metric screw thread.

In this embodiment, a member 13 is formed with an attachment hole 19 in which the fixing male screw portion 16 is fitted, and the member 13 is pressed against and fixed to the surface of the installation region 1 using the nut 17. It is unnecessary to insert the bolt 9 entirely into the hollow shaft 3, so that a bolt with a head can be used as the bolt 9. Moreover, the radially expansive portion 7 may be made to bulge in response to operating the bolt 9 while the member 13 is fixed.

The seventh embodiment shown in FIG. 3(B) is a modified example of the sixth embodiment. In this embodiment, a flange 4 is provided on the hollow shaft 3, a fixing male screw 16 is formed outwardly from the flange 4, and an engaging male screw 15 is formed on a side opposite to the fixing male screw 16. The flange 4 may preferably have a polygonal shape such as a hexagonal shape.

In the eighth embodiment shown in FIGS. 3(C) and 3(D), an engaging male screw 15 is formed on the outer circumference of the hollow shaft 3, and an engaging hole 20 for fitting engagement with a polygonal bit 11 having a hexagonal shape or the like is formed at the base end of the hollow shaft 3. Therefore, a flange 4 may be unnecessary.

In the ninth embodiment shown in FIG. 3(E), the bolt 9 for bulging the radially expansive portion 7a has a hexagonal socket, and the bolt 9 is set to be exposed to the outside of the hollow shaft 3 even in the state where the radially expansive portion 7 is bulged. The member 13 is fitted over the bolt 9 and fixed thereto using a nut 17. Therefore, in this embodiment, the bolt 9 for bulging the radially expansive portion 7 is used to attach (fix) the member 13. Further, a rotational operation (torque adjustment) of the bolt 9 can be easily performed by loosening the nut 17. The nut 17 also serves to prevent the bolt 9 from loosening.

Figure 4:
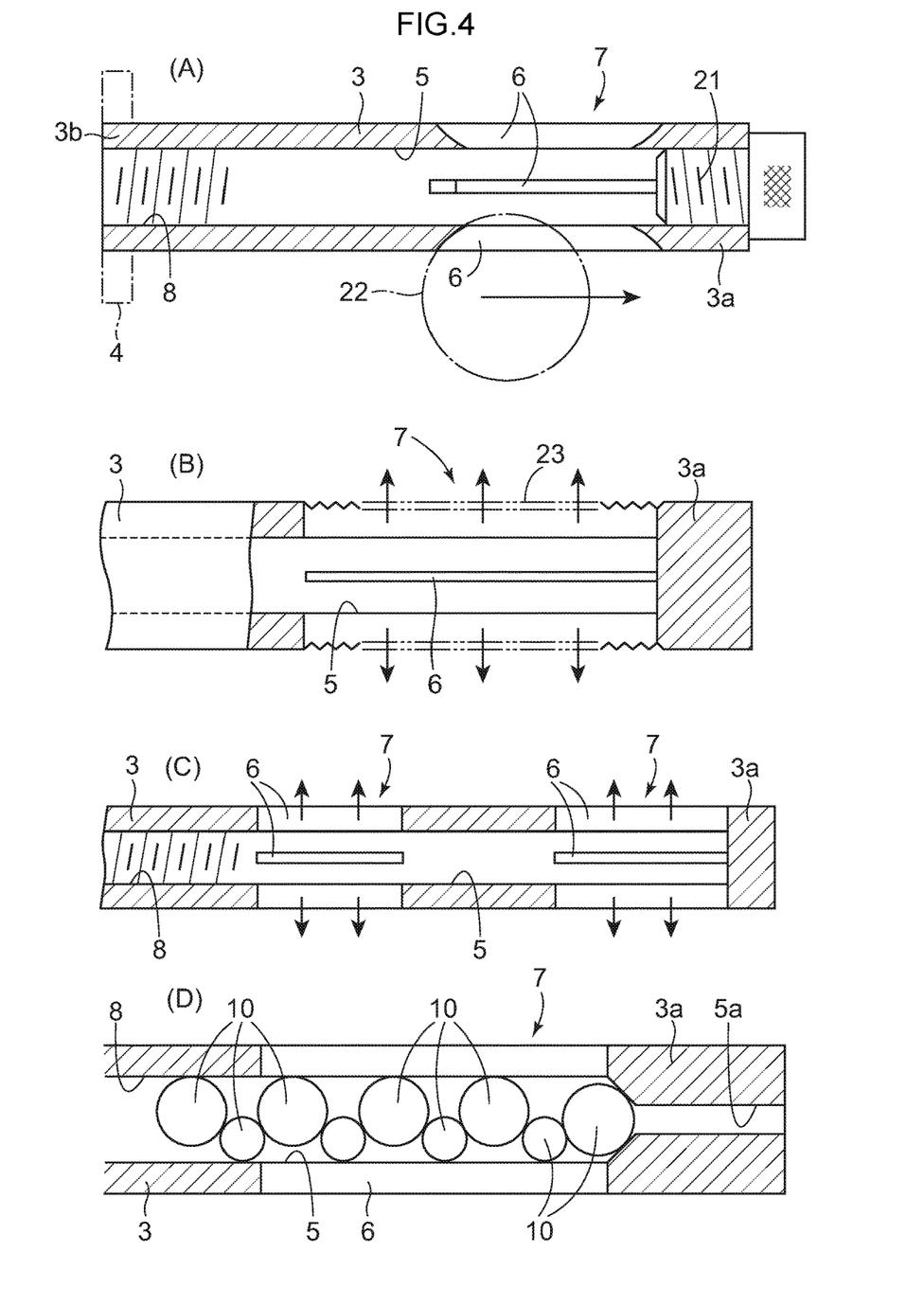
FIG. 4(A) is a sectional side view of a tenth embodiment.
FIG. 4(B) is a partially cutaway side view of an eleventh embodiment.
FIG. 4(C) is a sectional side view of a twelfth embodiment.
FIG. 4(D) is a sectional side view of a thirteenth embodiment.

(4) Tenth to Thirteenth Embodiments (FIG. 4)

In the tenth embodiment shown in FIG. 4(A), a hole 5 is formed in the hollow shaft 3 over the entire length thereof, and a female screw 8 is formed in the hole 5 over the entire length thereof, and a stopper bolt 21 is screwed into the hollow shaft from the tip end thereof. In this embodiment, use may be made of a pipe for forming the hollow shaft 3, thus contributing to a cost reduction. Female screws 8 may be formed only on two sides flanking the radially expansive portion 7. Also shown is a milling cutter 22 that is machining the slits 6. Although the milling cutter 22 is shown to be moved in the figure, the hollow shaft 3 may be moved instead. A fixing male screw 16 such as shown in FIG. 3(A) may be formed at the base end 3b of the hollow shaft 3 in this embodiment as well.

Punching press may be used as a means for forming the slits 6. More specifically, the slits 6 can be formed through punching by inserting a grooved rod into the hollow pipe 3 and moving a punch toward the groove of the rod from the outside. The tip end of the hollow pipe 3 may be closed by crushing or squeezing deformation instead of screwing a stopper bolt 21.

In the eleventh embodiment shown in FIG. 4(B), the outer circumferential surface of the radially expansive portion 7a is formed with wavy irregularities at a fine pitch. This embodiment is similar to the embodiment shown in FIG. 2(D), but differs from the embodiment shown in FIG. 2(D) in that the irregularities are provided by forming a multiplicity of grooves on the radially expansive portion 7. Therefore, the projections of the irregularities does not provide resistance to insertion of the hollow pipe into the pre-formed hole 2. Nevertheless, the projections come into biting engagement with the pre-formed hole 2 when the radially expansive portion 7 bulges, thereby providing a high withdrawal resistance.

In the twelfth embodiment shown in FIG. 4(C), two radially expansive portions 7 are formed as axially separated from each other. With this configuration, the two radially expansive portions 7 press against the pre-formed hole 2 as axially spaced from each other. Therefore, a very high withdrawal resistance may be expected. Three or more radially expansive portions 7 may be formed at positions that are axially separated from one another. Further, the plurality of radially expansive portions 7 may differ from each other in length.

In the thirteenth embodiment shown in FIG. 4(D), diametrically different balls 10 are used as the radially expanding action member. In this embodiment, the group of the balls 10 can be caused to press against the inner surface of the radially expansive portion 7 in a distributed manner as much as possible, so that the plurality of sections divided by the slits 6 are easy to bulge individually.

Figure 5:
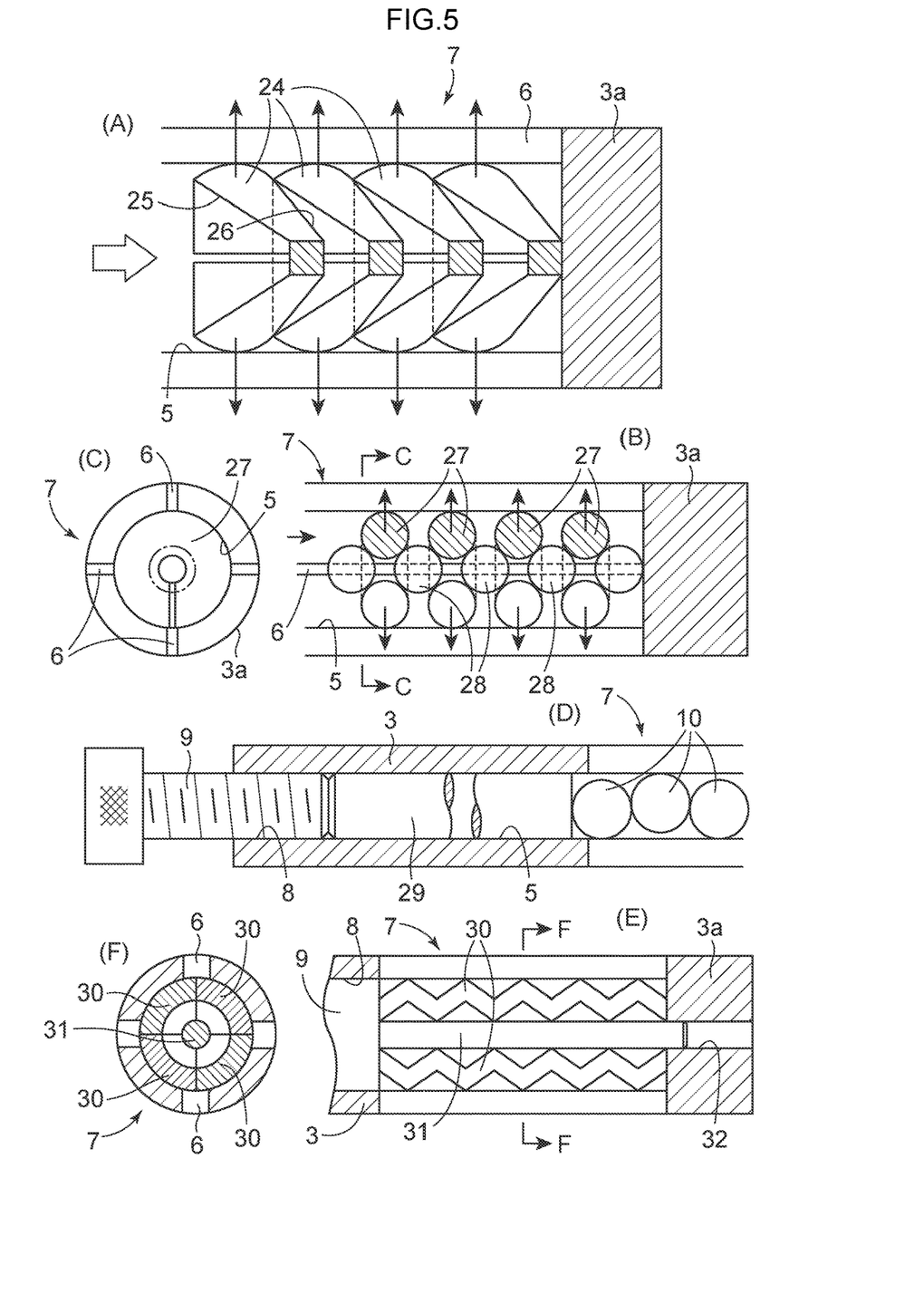
FIG. 5(A) is a sectional side view of a fourteenth embodiment.
FIG. 5(B) is a sectional side view of a fifteenth embodiment.
FIG. 5(C) is a sectional view taken along line C-C in FIG. 5(B)
FIG. 5(D) is a sectional side view of a sixteenth embodiment.
FIG. 5(E) is a sectional side view of main portions of a seventeenth embodiment.
FIG. 5(F) is a sectional view taken along line F-F in FIG. 5(E).

(5) Fourteenth to Seventeenth Embodiments (FIG. 5)

Next, fourteenth to seventeenth embodiments shown in FIG. 5 will be described. In the fourteenth embodiment shown in FIG. 5(A), a multiplicity of (a plurality of) bowl-shaped elements 24 that overlap one another are used as the radially expanding action member. The outer circumference and inner circumference of the bowl-shaped element 24 are respectively formed into tapered surfaces 25 and 26 that are both inclined in the same direction. The inclination angle of the inner tapered surface 25 is smaller than the inclination angle of the outer tapered surface 26. A portion other than the central portion is divided by a plurality of (four) slits that extend radially. Therefore, the bowl-shaped elements 24 are bulgeable to increase its outer diameter.

When the group of the bowl-shaped elements 24 are pressed toward the tip end 3a of the hollow shaft 3 using the bolt 9, each of the bowl-shaped elements 24 deforms expansively, thereby causing the radially expansive portion 7 to bulge. The outer circumference of each of the bowl-shaped elements 24 is convexly curved in cross section to come into line contact with the radially expansive portion 7.

In the fifteenth embodiment shown in FIGS. 5(B) and 5(C), the radially expanding action member comprises a group of discontinuous rings 27 each bent into an annular shape, and balls (steel balls) 28 each arranged between the adjacent rings 27. The rings 27 are formed by bending a wire having a circular cross section substantially into a circular form. However, since one end of the wire is not connected to the other end, the ring 27 deforms expansively under pressure from the balls 28.

In this embodiment, the radially expansive portion 7 can be expanded uniformly in the circumferential direction by the rings 27. Therefore, it is expected that the radially expansive portion 7 is prevented from coming into localized contact with the pre-formed hole 2, consequently providing a very high withdrawal resistance.

In the sixteenth embodiment shown in FIG. 5(D), a rod 19 is arranged between the bolt 9 and the balls 10. Therefore, the bolt 9 may be shortened, and the time needed for machining the female screw hole 8 can be reduced.

In the seventeenth embodiment shown in FIGS. 5(E) and 5(F), a wavy element 30 that is bent into a zigzag manner in the axial direction is used as the radially expanding action member. The wavy element 30 is divided into four equal sections in the circumferential direction (or may be divided into three equal sections or five or more equal sections). Therefore, when the wavy element 30 is pressed by the bolt 9, its outer diameter increases due to a reduction of its length, consequently causing the radially expansive portion 7 to bulge.

A stopper rod 31 is provided in a portion surrounded by the wavy element 30. Due to the presence of this stopper rod 31, the wavy element 30 deforms to increase its outer diameter. The stopper rod 31 is integrally or separately formed on the bolt 9, and slides in a hole 32 formed in the tip end 3a of the hollow shaft 3 when the bolt 9 is screwed in. In this embodiment as well, the sections divided by the slits 6 can be bulged uniformly.

(6). Use Example (FIG. 6)

Figure 6:
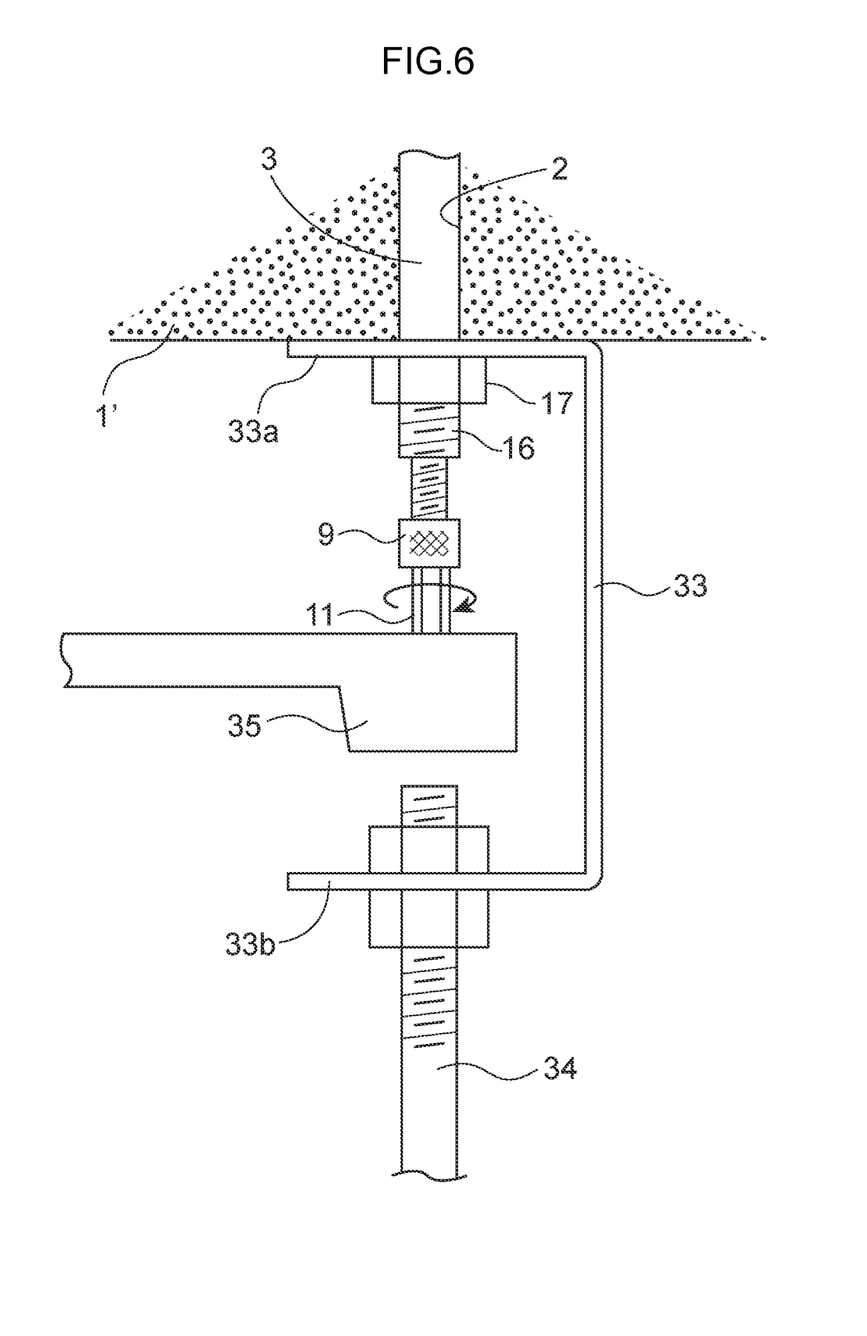
FIG. 6 is a view showing a use example of the expansion anchor shown in FIG. 3(A).

FIG. 6 specifically shows an exemplary use of the expansion anchor shown in FIG. 3(A). In this exemplary use, the expansion anchor is applied to a ceiling portion 1' of a tunnel, for example, and the fixing male screw 16 provided at the base end of the hollow shaft 3 is exposed downward from the ceiling surface. An upper piece 33a of a channel suspension fitting 33 is fixed to the ceiling surface using the nut 17, and a suspension bolt 34 is attached to the lower piece 33b of the suspension fitting 33. The suspension bolt 34 is used to suspend a ceiling panel or a ceiling frame.

A socket bolt in which a hexagonal hole is formed in its head is used as the bolt 9 for expanding the radially expansive portion 7, and the head is exposed downward from the ceiling surface (a bolt with a polygonal head can also be used). It is possible to determine, by rotating the bolt 9 with a torque wrench 35, whether or not the hollow shaft 3 retains an appropriate withdrawal resistance. In this case, when the torque wrench 35 indicates a predetermined value of measurement with the bolt 9 kept non-rotated, an appropriate withdrawal resistance is still retained, so that it is not necessary to take any specific countermeasure.

On the other hand, when the bolt 9 rotates before the measurement of the torque wrench 35 reaches the predetermined value, the biting force of the radially expansive portion 7 against the installation region 1 may have decreased. Therefore, the bolt 9 is rotated until the measurement of the torque wrench increases to the predetermined value. In this way, the provision of the fixing male screw 16 at the base end of the hollow shaft 3 enables the maintenance of the expansion anchor (adjustment of withdrawal resistance) without removing the suspension fitting 33. Therefore, the maintenance can be performed easily and efficiently.

It should be noted that, as a bolt 9 for expanding the radially expansive portion 7, use may be made of a hexagonal-socket bolt having no enlarged head or a bolt with a quadrangular head the circumcircle of which has a diameter equal to or smaller than the outer diameter of the screw thread. The use of such a bolt is advantageous in that it does not affect screwing of the nut 17.

(7) Testing Results

Figure 7:
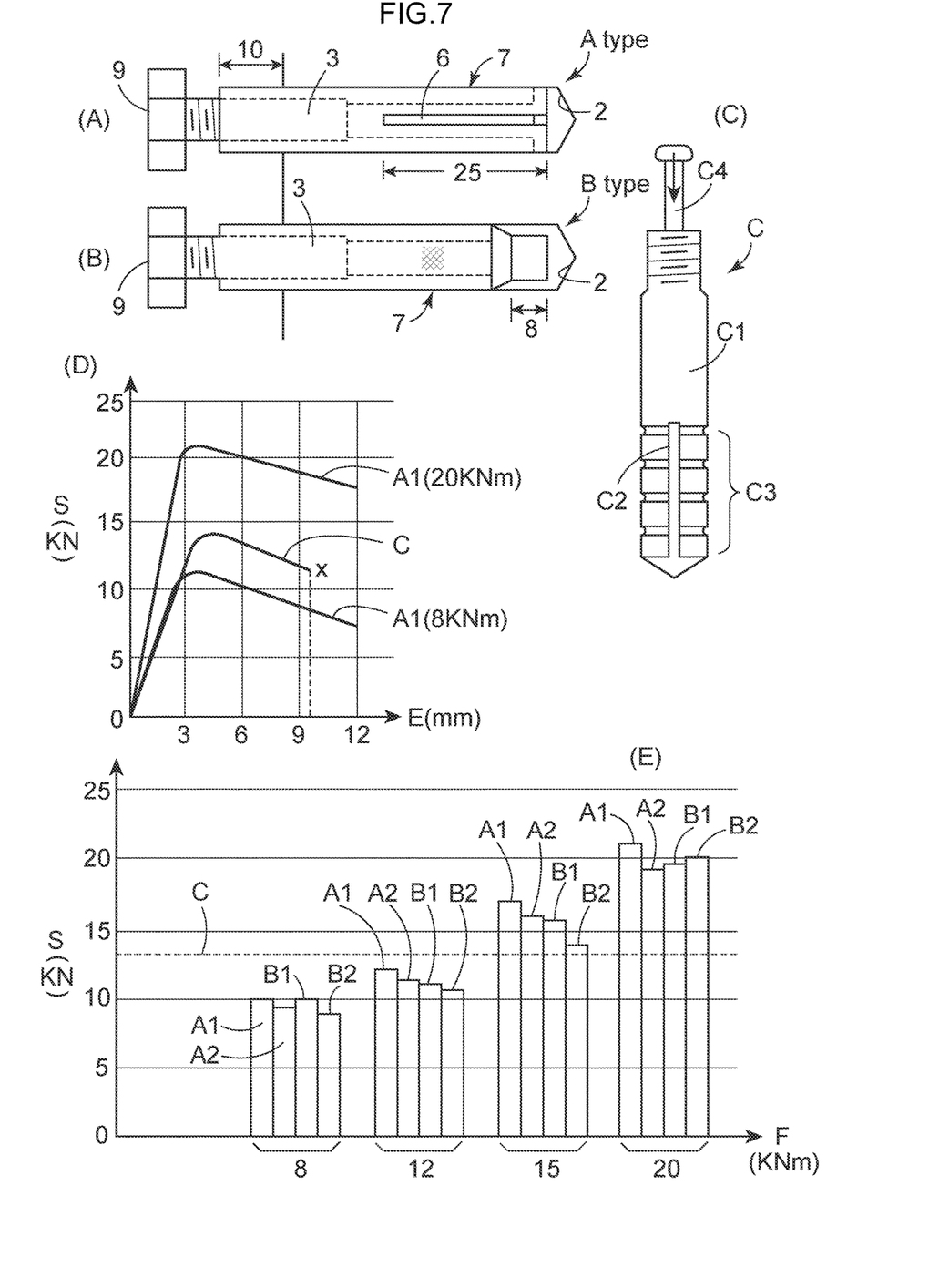
FIG. 7 illustrates a test for examining the advantageous effects of the present invention.

The inventors of the present invention tested the performance of embodied products of the present invention. FIG. 7 shows the test. FIGS. 7(A) and 7(B) show samples that were used in the test. The samples were similar to the first embodiment. The outer diameter was 10 mm, the entire length was 60 mm, the inner diameter of the hollow shaft was about 6 mm, and a 8-mm bolt was used as the bolt 9 (the inner diameter of the pre-formed hole of a 8-mm female screw corresponded to the inner diameter of the hollow shaft).

Regarding an A-type exemplary sample, the radially expansive portion 7 had a length of about 25 mm, the hollow shaft 3 had a constant diameter over the entire length thereof, and the tip end was closed. Regarding a B-type exemplary sample, a portion of about 8 mm at the tip end was squeezed, and therefore, the radially expansive portion 7 was shorter than that of the A type. In both samples, a plurality of diametrically different steel balls were used as the radially expanding action member. More specifically, one ball having an outer diameter of 6 mm, three balls having an outer diameter of 4.5 mm, three balls having an outer diameter of 5 mm, and one ball having an outer diameter of 6 mm were arranged in this order from the bolt 9 side.

A conventional product (commercially available product) C shown in FIG. 7(C) was used as a comparative example. Regarding this conventional product C, the entire length and outer diameter were the same as those of the two samples (60 mm, 10 mm), and four slits C2 were formed in the tip end side of a hollow shaft C1 to be open at the tip end face. Thus, a portion in which the slits were formed was an radially expansive portion C3 to be expanded into a flaring manner. A pin C4 was inserted into the hollow shaft C1 from the base end. The pin C4 had a tapering tip end. When the pin C4 was hit into the radially expansive portion C3, the radially expansive portion C3 was expanded. Therefore, the withdrawal resistance of this comparative example C became constant.

Two A-type samples and two B-type samples were manufactured, and the withdrawal resistance thereof was measured at varying screwing torques of the bolt 9. The graph in FIG. 7(E) shows the results. Specifically, in FIG. 7(E), the horizontal axis F indicates the screwing torque of the bolt 9, whereas the vertical axis S indicates the withdrawal resistance. A concrete block was used as a target product serving as the installation region.

A1 was an A type in which the outer circumference of the radially expansive portion 7 was knurled, and A2 was an normal A type in which the outer circumference of the radially expansive portion 7 was smooth. B1 was a B type in which the outer circumference of the radially expansive portion 7 was knurled, whereas B2 was a normal B type in which the outer circumference of the radially expansive portion 7 was smooth. Knurling was performed in an inclined lattice pattern with a fine pitch.

The graph in FIG. 7(E) clearly shows that the withdrawal resistance increases with an increase in the screwing torque of the bolt 9. It can be understood from these results that the withdrawal strength can be controlled to a desired level by controlling the torque of the bolt 9. It can also be understood that the withdrawal resistance increased due to knurling, and there was no significant difference between the A type and the B type.

The graph in FIG. 7(D) shows relationship between the amount of shift of the expansion anchor and the withdrawal resistance when the expansion anchor was pulled using a drawing test machine. Specifically, in the graph in FIG. 7(D), the horizontal axis indicates an axial shift, while the vertical axis indicates a withdrawal resistance.

The test used an A1 type bolt 9 that was screwed at 20 KNm, an A1 type bolt 9 that was screwed at 8 KNm, and a comparative example C. In either of these samples, the withdrawal resistance of the anchor had a peak value, and the withdrawal resistance decreased with an increase of drawn amount after exceeding the peak value. Such a result was predictable.

On the other hand, in the graph in FIG. 7(D), it is noteworthy that, in the comparative example C, cone-type failure occurred in concrete due to a shift of more than 9 mm, so that no further drawing became impossible, whereas in both embodiments of the present invention did not suffer from cone-type failure. In particular, although the sample screwed at 20 KNm exhibited a withdrawal strength higher than the comparative example C, cone-type failure did not occur in the installation region. This fact shows that the embodied sample of the present invention is very useful in preventing cone-type failure.

The above-noted experiment, which was performed in a simple manner by the inventors of the present invention, is considered to clearly show the features of the present invention. It is believed that, in the future, better implementations may be provided by selecting the dimensions of various elements. An A type sample and a B type sample were prepared in which 6-mm balls were arranged one at each of the front end and the rear end and thirty 3-mm balls were arranged between both balls. Though the withdrawal resistance of these samples was not measured, the sections divided by the slits 6 bulged substantially uniformly.

As a manner of arranging diametrically different balls 10, a multiplicity of diametrically larger balls having substantially the same diameter as the inner diameter of the radially expansive portion 7 are arranged, and a plurality of (e.g., four to six) diametrically smaller balls are arranged between adjacent ones of the diametrically larger balls generally at an axial center of the radially expansive portion 7. In this example, it is expected that the sections divided by the slits bulge uniformly due to the plurality of diametrically smaller balls that are radially pushed by the two diametrically larger balls sandwiching them.

(8) Further Variations

When the samples A and B shown in FIG. 7 were examined, only a certain circumferential position of the radially expansive portion 7 bulged largely. It is considered from this fact that, in order to increase the withdrawal resistance, the radially expansive portion 7 need not bulge uniformly over the entire circumference, but rather deep biting engagement is important.

Figure 8:
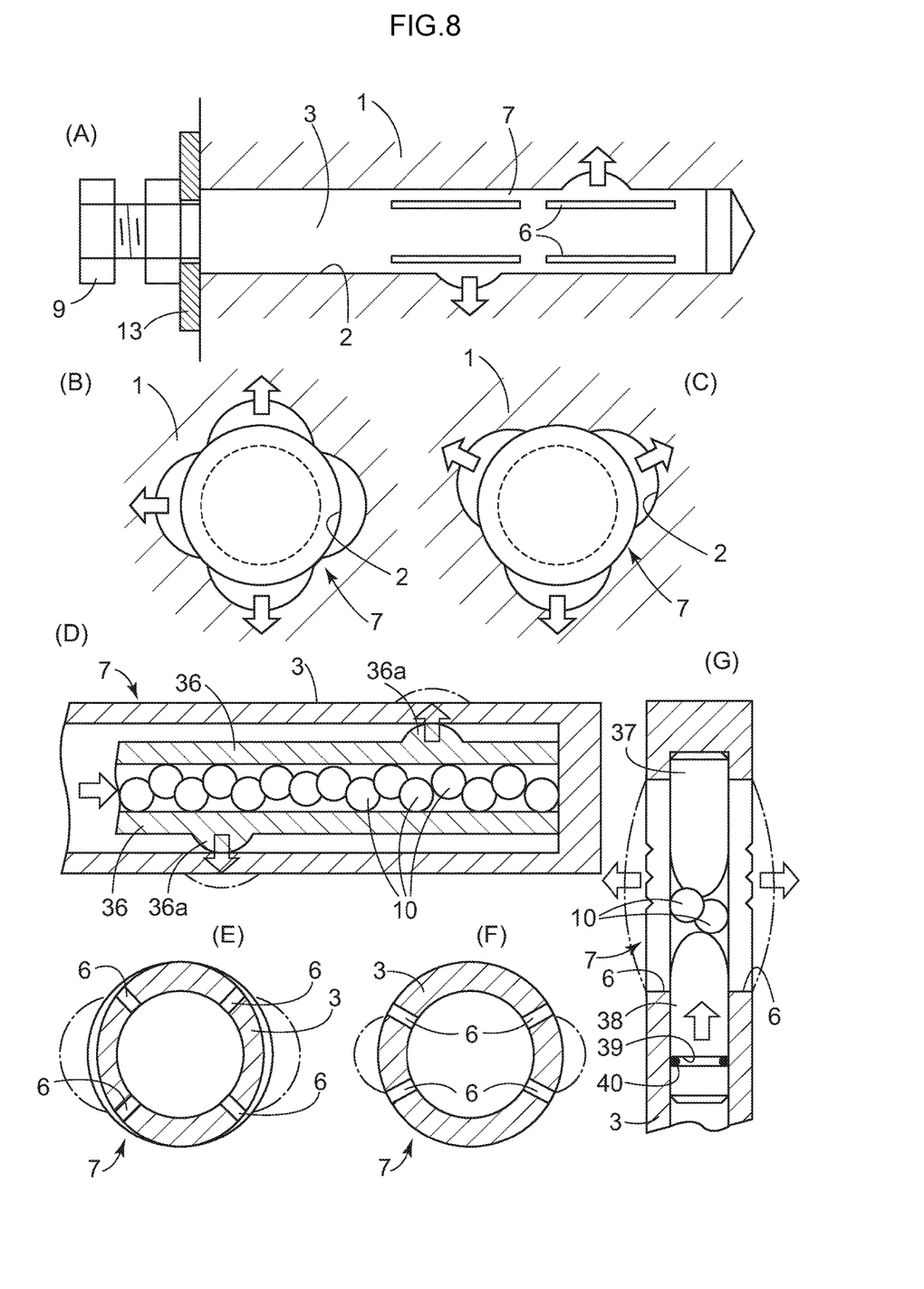
FIGS. 8(A) to 8(C) are views showing preferred bulging states of a radially expansive portion.
FIG. 8(D) is a sectional view of an eighteenth embodiment.
FIG. 8(E) is a sectional view of a nineteenth embodiment.
FIG. 8(F) is a sectional view of a twentieth embodiment.
FIG. 8(G) is a sectional view of a twenty-first embodiment.

In this case, when bulging occurs at positions of the radially expansive portion 7 that are displaced axially and circumferentially as shown in FIG. 8(A), it is expected that a high withdrawal resistance can be obtained while suppressing an increase in compressive stress on the installation region 1 (thus preventing cone-type failure). It should be noted that, in the embodiment shown in FIG. 8(A), the member 13 is fixed to the installation region 1 using the bolt 9 for bulging the radially expansive portion 7.

When the radially expansive portion 7 is divided by four slits, it is considered ideal that the four sections are bulged at alternately different positions which are displaced circumferentially and axially from each other as shown in FIG. 8(B). When the radially expansive portion 7 is divided by three slits, it is considered ideal that the three sections are bulged at alternately different positions which are displaced circumferentially and axially from each other as shown in FIG. 8(C). Even when two bulges are located at the same axial position and at diametrically opposite positions with respect to the axis, it is considered possible to secure a high withdrawal resistance without causing cone-type failure.

When the balls (steel balls) 10 are used as the radially expanding action member, the balls 10 come into contact with the radially expansive portion 7 from the inside in an irregular manner. Therefore, it may be difficult to cause bulging of the radially expansive portion 7 at positions that are axially displaced from each other. In one example of a countermeasure against this, as shown in an eighteenth embodiment shown in FIG. 8(D), auxiliary members 36 are inserted into the radially expansive portion 7, so that the radially expansive portion 7 is caused to bulge via the auxiliary members 36.

Specifically, the auxiliary members 36 are arranged in corresponding relation to and without any circumferential shift from the sections of the radially expansive portion 7 divided by the slits, and outward protrusions 36a are provided at axially shifted positions on the auxiliary members 36 respectively. The auxiliary members 36 have such a strength that they do not easily deform. When the group of the balls 10 are pushed by a bolt, the auxiliary members 36 are radially pushed, and the respective sections of the radially expansive portion 7 are bulged due to the protrusions 36a of the auxiliary members 36.

In a nineteenth embodiment shown in FIG. 8(E), at least the radially expansive portion 7 is formed in an elliptic shape, and four slits 6 are formed to circumferentially separate thin portions and thick portions. In this embodiment, the thin portions are concentratively deformed, so that the radially expansive portion 7 can be easily bulged in a symmetrical manner. (The balls come into contact with the thin portions at axially separated positions. Therefore, even when the radially expansive portion 7 is bulged in a symmetrical manner, the bulges are shifted in the axis direction.)

In a twentieth embodiment shown in FIG. 8(F), the slits 6 are formed at uneven intervals in the radially expansive portion 7 which is perfectly circular, thereby providing easily deformable zones in the radially expansive portion 7. In this case as well, so that the radially expansive portion 7 can be easily bulged in a symmetrical manner.

In the case where a member is fixed using an anchor that is hit into a wall, for example, a downward load is applied to the member, so that a high withdrawal resistance can be obtained when the radially expansive portion 7 bulges upward. In the embodiments shown in FIGS. 8(E) and 8(F), the radially expansive portion 7 bulges constantly in one direction. Therefore, when the hollow shaft 3 is set to assume a predetermined rotational orientation, the radially expansive portion 7 can be made to bulge in a desired direction. This point is one of the advantages of the embodiments shown in FIGS. 8(E) and 8(F).

In a twenty-first embodiment shown in FIG. 8(G), two pins 37*m* 38 are inserted into the hollow shaft 3 at a forward position and a rearward position, respectively, and a plurality of balls 10 are arranged between the two pins. The pins 37, 38 are formed into a bullet shape having a tapering tip end, and they are arranged such that their tip ends face each other. Therefore, when the rear side pin 38 is pushed using a bolt, the balls 10 are rearranged into a circumferential array due to the clamping action of the pins 37, 38 while moving outward orthogonally to the axis in such an array. Accordingly, the radially expansive portion 7 can be made to bulge accurately at a predetermined position.

The number of the balls 10 may be set to be three to ten, for example. In this embodiment, when the two pins 37, 38 come into contact with each other, the bolt 9 cannot be further screwed, consequently preventing the radially expansive portion 7 from bulging excessively. In other words, in this embodiment, the maximum screwing torque of the bolt 9 can also be controlled. The tip ends of the pins 37, 38 may be conical or frustoconical, or may be curved to be outwardly concave as opposed to the illustrated embodiment.

The features shown in FIG. 8(G) and the features shown in FIG. 8(E) or 8(F) may be combined for causing the radially expansive portion 7 to readily bulge at two opposite positions that are separated by 180 degrees. It is also possible to use three pins and arrange balls 10 between the adjacent pins. In this case, two radially expansive portions 7 are provided as axially separated from each other, so that the two radially expansive portions 7 are separately expansive using the balls. Therefore, the embodiment shown in FIG. 8(A) may be realized easily. Use may be made of four or more pins for bulging at three or more axially different portions.

In the twenty-first embodiment shown in FIG. 8(G), an annular groove 39 is formed in the outer circumferential surface of the pin 38 at an rear end portion, and an O-ring (or a rubber ring) 40, which is an example of a removal restraining means, is fitted in the annular groove 39. The O-ring 40 is fitted into the hollow shaft 3 in an elastically deformed state, so that it does not remove easily. Therefore, the balls 10 are prevented from falling out due to careless handling during assembly. Even when the bolt 0 is removed after the installation, the pins 37, 38 and the balls 10 do not fall out.

(9) Other Embodiments

The present invention may provide various other embodiments in addition to the above-described embodiments. For example, the radially expanding action member is not limited to those shown in the drawings, and any radially expanding action member may be used as long as it is capable of pressing against the radially expansive portion from the inside in response to a pushing action of the bolt. Therefore, a wire rod bent into a bow shape or a helically wound member such as a coil spring may also be used. When a helically wound member having a triangular or trapezoidal cross section is used, it is capable of providing a high radially expanding action.

As a means for enhancing the ability of preventing the hollow shaft from withdrawal, the outer circumferential surface of the radially expansive portion may be provided with a multiplicity of projections. A member such as a suspension fitting may be welded in advance to the hollow shaft. Further, the hollow shaft, the radially expanding action member and the bolt may be made of a resin if there is no problem with respect to thermal resistance. The radially expansive portion may also be formed by replacing the slits with a multiplicity of holes or thin-walled sections.

Regarding a means for preventing the radially expanding action member such as balls from falling out, a plug made of a soft material such as rubber, for example, may be inserted into the hollow shaft. The plug is crushed by the bolt, so that it does not pose any problem with respect to the function of pressing against the balls. When the bolt is removed, the plug is held inside the hollow shaft, so that the radially expanding action member such as balls can be prevented from falling out.

As another removal preventing means, use may be made of a metal plug formed on its outer circumference with an annular groove for fitting an elastic ring such as an O-ring. In this case, the radially expanding action member such as balls is pressed by the bolt via the plug.

INDUSTRIAL APPLICABILITY

The present invention can be practically embodied as an expansion anchor. Therefore, the present invention is industrially applicable.

DESCRIPTION OF SIGNS

1 Installation region
2 Pre-formed hole
3 Hollow shaft
3a Tip end
3b Base end
4 Flange
6 Hole
7 Radially expansive portion
8 Female screw portion
9 Bolt for expanding radially expansive portion
10 Metal ball as an example of radially expanding action member
12 Bolt for fastening a member
13 Member attached using an expansion anchor
15 Engaging male screw for engagement with a pre-formed hole
16 Fixing male screw
17 Nut
24 Bowl-shaped element as an example of radially expanding action member
27 Ring as an example of radially expanding action member
30 Wavy element as an example of radially expanding action member
33 Suspension fitting
34 Suspension bolt
35 Torque wrench

The invention claimed is:
1. An expansion anchor comprising:
a hollow shaft to be inserted, from a tip end thereof, into a pre-formed hole formed in an installation region, and
a bolt to be screwed into a female screw hole of the hollow shaft from outside the installation region,
wherein the hollow shaft is formed with a radially expansive portion, that is weakened to be bulgeable, at a portion of the hollow shaft within the pre-formed hole and short of the tip end of the hollow shaft, and the hollow shaft is internally provided with a radially expanding action member that pushes the radially expansive portion radially outward in response to pushing action caused by screwing of the bolt into the hollow shaft; and
wherein the bolt is configured to be screwed entirely into the female screw hole of the hollow shaft to allow another bolt to be screwed into the female screw hole and to thereby fasten a member to be anchored to the installation region.

2. The expansion anchor according to claim 1, wherein the radially expansive portion of the hollow shaft is formed with a plurality of axially elongated slits that are circumferentially spaced from each other.

3. The expansion anchor according to claim 1, wherein the radially expanding action member includes a multiplicity of metal balls, and the radially expansive portion is allowed to bulgingly deform due to the balls moving radially outward in group in response to a push from the bolt.

4. The expansion anchor according to claim 3, wherein the radially expansive portion has an axial length that is at least twice an outer diameter of the hollow shaft.

5. An expansion anchor comprising:
a hollow shaft to be inserted, from a tip end thereof, into a pre-formed hole formed in an installation region,
a bolt to be screwed into a female screw hole of the hollow shaft from outside the installation region, and
a multiplicity of metal balls accommodated in a hole of the hollow shaft between the bolt and the tip end of the hollow shaft;
wherein the hollow shaft is formed with a radially expansive portion that is radially expanded by the balls in response to pushing action caused by screwing of the bolt into the hollow shaft;
wherein the radially expansive portion of the hollow shaft is formed with a plurality of axially elongated slits that are circumferentially spaced from each other; and
wherein the balls move radially outward in group in response to a push from the bolt while the multiplicity of metal balls remain in the hole of the hollow shaft between the bolt and the tip end of the hollow shaft;
wherein the bolt is configured to be screwed entirely into the female screw hole of the hollow shaft to allow another bolt to be screwed into the female screw hole and to thereby fasten a member to be anchored to the installation region.

6. The expansion anchor according to claim 5, wherein the balls include balls with different diameters.

* * * * *